May 7, 1957    A. L. SAXTON    2,791,536
APPARATUS FOR CONTACTING LIQUIDS
Filed Sept. 30, 1953    2 Sheets-Sheet 1

INVENTOR
Arthur L. Saxton
BY
W. N. Wright
ATTORNEY

May 7, 1957  A. L. SAXTON  2,791,536
APPARATUS FOR CONTACTING LIQUIDS
Filed Sept. 30, 1953  2 Sheets-Sheet 2

INVENTOR
Arthur L. Saxton
BY
W. N. Wright  ATTORNEY

United States Patent Office

2,791,536
Patented May 7, 1957

2,791,536

APPARATUS FOR CONTACTING LIQUIDS

Arthur L. Saxton, Plainfield, N. J., assignor to Esso Research and Engineering Company, a corporation of Delaware Application September 30, 1953, Serial No. 383,358

9 Claims. (Cl. 196—14.49)

The present invention relates to an improved process and apparatus for the countercurrent contacting of two incompletely miscible liquids having different densities. The invention has particular application in the field of liquid-liquid extraction wherein one liquid is contacted with a second liquid for the purpose of removing desirable or undesirable constituents from the former liquid as the case may be. In accordance with the present invention a novel contacting stage construction is employed in a vertical tower which is characterized by providing concurrent mixing and concurrent settling in each stage throughout the tower while maintaining countercurrent flow between stages.

The invention is directed broadly to processes in which liquids are treated by selective solvent action. At the present time there are a great many chemical processes in which a selective solvent is used to treat a particular liquid in order to secure a partial segregation or removal of chemical constituents from the liquid. For example, petroleum oils are conventionally treated with solvents such as liquid sulfur dioxide, phenol, cresol, nitrobenzene, furfural, aniline, ether and other solvents or mixtures of such solvents. These solvents are employed in treating petroleum oils particularly for removing low viscosity index constituents from an oil and thereby providing treated oil having an improved viscosity index. More generally, such solvent treating processes are employed to selectively remove undesired constituents from the liquid being treated with the solvent or in some cases to recover desired constituents.

In solvent treating operations of the general character above described, many modifications of a process nature are used to control the solvent extraction as desired—for example, auxiliary solvents or modifying agents may be injected into the treating system. Again a wide range of temperature and pressure conditions may be employed in particular types of solvent extractions. The present invention, however, is not concerned with the types of modifications or refinements. Instead, it is concerned with a basic method and apparatus used for contacting liquids whatever the particular system may be. It is, therefore, to be understood that this invention is of application to any liquid-liquid contacting system with any of the modifications which may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of many different designs, some employing various types of packing materials, others employing perforated plates, and others employing a wide variety of internal baffles.

A conventional liquid-liquid contacting tower generally consists of a large number of contacting stages that extend throughout the tower. A common type of tower, for example, contains a plurality of perforated horizontal metal plates that are vertically spaced one above the other throughout the tower. Sets of perforations in the plates allow one of the liquids to pass from plate to plate through the tower, while downcomers or other sets of perforations are provided to convey the other liquid from one plate to another in a direction countercurrent to the first liquid. The downcomers, perforations, etc., associated with the plates are generally positioned so as to provide horizontal flow of one or both of the liquids across the various plates and thereby induce more complete contacting between the liquids and a closer approach to equilibrium mass transfer. For example, where downcomers are employed it is general practice to position the downcomers of successive plates on diametrically opposite sides of the contacting tower.

In analyzing the necessary mechanism required in liquid-liquid contacting it is apparent that two basic effects are required. These are efficient mixing of the liquids followed by efficient separation of the mixed liquids. Thus in extraction towers having a given number of stages, for the best overall results it is necessary that each stage provide good mixing and also good settling. Only by achieving both of these desiderata in such a tower is it possible to secure treating effects equivalent to a large number of theoretical stages. It is, therefore, a particular object of this invention to provide a type of apparatus which will most effectively be capable of adequately mixing and thoroughly settling liquid phases passing through each stage.

In order to secure efficient mixing and settling of the liquids it is necessary to consider the basic characteristics of the liquids insofar as their mixing and settling properties are concerned. Thus, particular liquids such as phenol and oil may be very readily mixed and when mixed may be difficult to separate. Alternatively, other types of liquids such as aqueous caustic and oil, for example, may be difficult to mix but may be readily separated. As a result of this factor it is generally necessary to critically adjust a particular extraction tower to secure the optimum treatment of liquids having particular mixing and settling characteristics. It is, therefore, a further object of this invention to provide means for adapting a particular contacting tower to the optimum contacting conditions for liquids of particular mixing and settling characteristics.

The conventional tower described above as well as other already existing types of towers possess a number of disadvantages. First, the contacting stages employed therein are generally characterized by plate or actual stage efficiencies not substantially greater than about 50%. By plate efficiency as that term is used, it is meant that each plate or stage is effective in accomplishing a percentage of the degree of contacting that is realized at equilibrium in a single batch-stage mixer and settler. Thus, one theoretical stage is established by contacting two liquids intimately to equilibrium in a batch mixer followed by a thorough settling in a batch settler. As stated, therefore, conventional plate liquid contacting towers, due to their plate efficiency of about 50% at most substantially require a number of plates exceeding by about a factor of two the number of theoretical stages of contacting required. It is clearly of the greatest importance to improve the plate efficiency of the types of plates used in plate-type towers in order to decrease the expense of the contacting and to decrease the size of the towers. It is, therefore, a principal object of this invention to provide an improved type of plate extraction tower in which the plate efficiencies may be substantially above 50%.

A second disadvantage of conventional dispersion plate-type liquid-liquid towers lies in the fact that it is generally difficult to maintain phase interfaces between the discontinuous phase liquid and the continuous phase liquid at each of the contact plates except within a relatively narrow range of phase flow rates and differential specific gravities. This results from the fact that interface positions are normally dependent upon the frictional pressure drop which accompanies the flow of one phase or the other through the tray perforations. It is essential in this connection that such interfaces be continuously present between successive trays in order to prevent one or both of the liquids from by-passing the plates or otherwise upsetting the operation. It is particularly difficult to maintain such layers of liquid and the attendant phase interface positions within a tower when the tower is operated over a range of conditions, flow rates, etc. And it has been necessary, therefore, to closely observe and control the operation of a tower in order to prevent upsets in operation, by-passing of the plates, and the like.

Accordingly, it is an object of the present invention to provide a stage and a process for use in a liquid-liquid contacting tower that are characterized not only by high contacting efficiencies but also by a simplified and flexible operation. It is a particular object to provide a liquid-liquid contacting tower in which the phase interface positions are relatively independent of the phase flow rates. Thus, the towers of the present invention are essentially limited only by the settling requirements of the phases.

The objectives described above are achieved in accordance with the present invention by the use of a vertically disposed tower containing a plurality of vertically superposed contacting stages. Each stage in the tower comprises a vertically disposed, laterally confined mixing zone and a horizontally disposed settling zone.

The mixing zone in each stage has an upstream end and a downstream end. The downstream end of each mixing zone discharges directly into the entrance or upstream end of its respective settling zone. The mixing zones and the upstream ends of the settling zones of successive stages are disposed laterally opposite to one another within the tower proper. Thus, the directions of liquid flow in the settling zones of successive stages are directly opposite to one another.

Conduit means are provided at the top of the tower for introducing the heavier of the two liquids within the tower; and other conduit means are provided at the bottom of the tower for removing the heavier liquid from the tower after it has traversed the stages in the tower. Similar conduit means are provided for introducing the lighter of the two liquids within the bottom of the tower and for withdrawing this liquid from the top of the tower.

The vertical orientation of the mixing zones in the contacting tower is determined by whether the continuous phase liquid is the heavier or the lighter of the two liquids being processed. The downstream ends of the mixing zones must always be vertically disposed toward the end of the tower where the continuous phase liquid enters the tower. Conversely the upstream ends of the mixing zones must always be vertically disposed toward the end of the tower where the discontinuous phase liquid enters the tower. Thus, when the continuous phase liquid is the heavier of the two liquids, this particular liquid will enter the top of the tower; and each of the mixing zones in the tower will be disposed so that its downstream end faces toward the top of the tower.

Each settling zone in the tower must be of a character adapted to settle mixtures of the continuous phase liquid and the discontinuous phase liquid into separate layers of the same. Such considerations, of course, are well known in the art and need not be described at length here.

The continuous phase liquid in flowing from stage to stage through the tower is withdrawn from its phase layer in the settling zone of each stage and is passed to the entrance or upstream end of the mixing zone in the next adjacent stage. The flow between stages of this liquid is provided by a first set of conduits which convey the continuous phase liquid from the settling zone of each stage to the mixing zone of the next adjacent stage.

The discontinuous phase liquid passes from stage to stage through the tower by means of a second set of conduits that interconnect the layers of discontinuous phase liquid in the settling zones of each of the stages in the tower to the entrances of the mixing zones in the next adjacent stages. But the discontinuous phase liquid in passing in this manner from one stage to the next adjacent stage must also pass through a liquid trap or seal. One such trap is provided for each stage.

The liquid traps in the tower serve two purposes. First, they continuously maintain a layer of discontinuous phase liquid in the settling zone of each stage in the tower over a wide range of liquid flow rates and liquid physical properties. Second, each liquid trap prevents the continuous phase liquid from by-passing any of the contacting stages as it passes through the tower.

The discontinuous phase liquid in entering the mixing zone of each stage in the tower must also flow over a weir that is adapted to distribute this liquid substantially uniformly across the cross-section of the entrance to the mixing zone. In other words, the discontinuous phase is distributed across the entrance to the mixing zone in the form of a weir sheet. Each weir is preferably of the serrated or notched type so that the stream of discontinuous phase liquid, as it enters the mixing zone of any given stage, is broken up into a plurality of small streams. Triangular, square, trapezoidal, rectangular, and the like types of notched weirs may be employed. The V-notch weir is especially preferred. In any case, it is preferred that the depths and widths of the notches be sufficient to accommodate the largest and smallest expected flow rates for the discontinuous phase liquid. The weirs also may be straight chordal elements, or they may possess other structural shapes. For example, they may be peripheral-type weirs that are square, round, rectangular and the like in shape.

Each mixing zone is preferably provided with means for mixing the two liquids. Suitable mixing means include mechanical means such as propellers, paddles, vibrating perforated plates and other mechanical mixing devices that are capable of providing a high degree of shear with little or no pumping action. Especially preferred mechanical mixing means are vibrating, perforated-plate assemblies of the type described in pending patent application Serial No. 75,904 filed on February 11, 1949 by Fenske et al., now U. S. Patent 2,667,407.

Other mixing means such as conventional packing materials may also be employed alone or in combination with the mechanical mixers described above. Any of the packing materials that are customarily used for liquid-liquid contacting processes may be employed in the present apparatus. Suitable packing materials include Raschig rings, Berl saddles, wire mesh, finely-divided solids and the like.

It will be realized that the continuous phase of liquid and the discontinuous phase liquid that enter the mixing zone of any given stage in the tower are taken from the settling zones of stages that are on opposite sides of the given stage. But the heavier of the liquids will always enter the mixing zone of any given stage from the settling zone of the stage that is vertically above the given stage. Conversely, the lighter of the two liquids will always enter the mixing zone of the given stage from the settling zone of the stage that is vertically below the given stage.

The present invention may be better understood by reference to the attached figures which depict preferred embodiments of the same.

Figure 1:
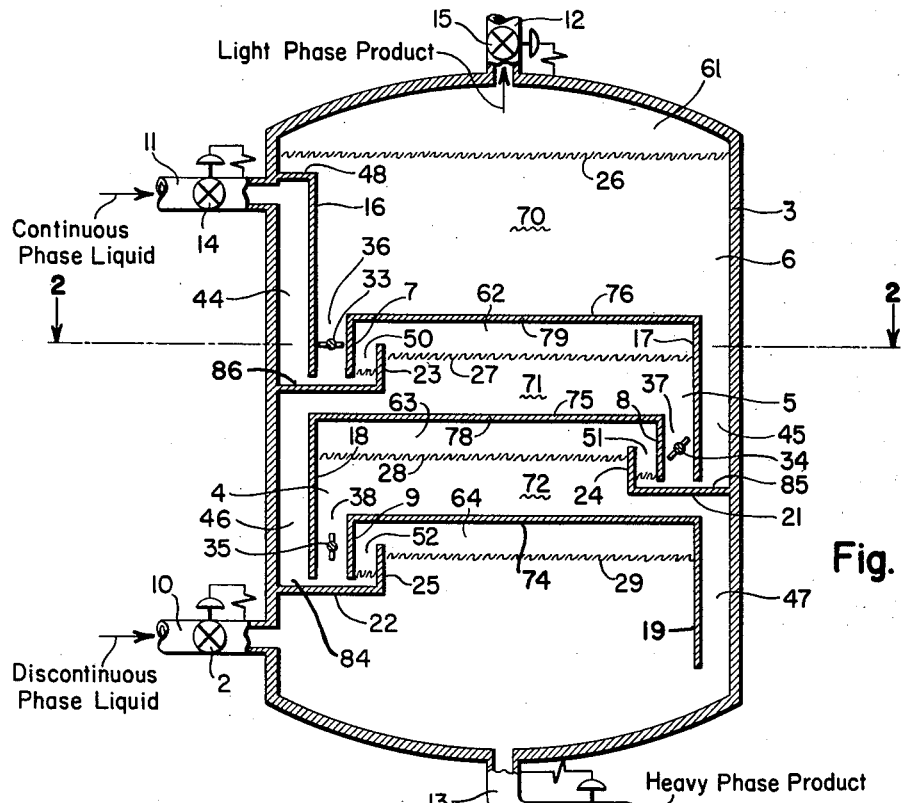
Figure 1 is an elevational, cross-section view of a preferred type of liquid-liquid extraction tower embodying the principles of the present invention.
Figure 2:
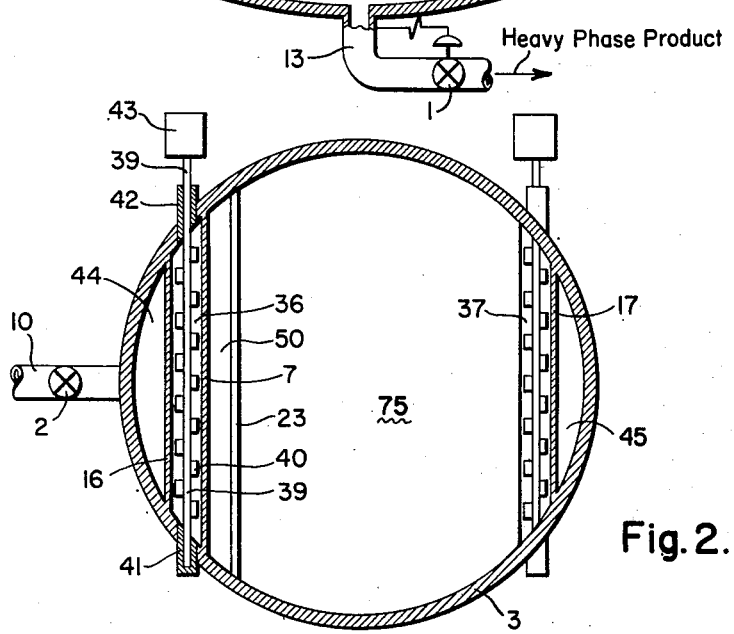
Figure 2 is a cross-section view of such a tower taken through the line 2—2 of the apparatus shown in Figure 1.

Referring to the drawings it will be noted that the contacting tower illustrated in Figures 1 and 2 comprises a vertically elongated cylinder which is provided with three contacting stages 4, 5 and 6. Each of these stages comprises a plate element and a trap chamber, the latter of which is troughlike in appearance and will be referred to later hereinafter as a trough element. For example, stage 5 consists of a plate element 75 and trough element 85. Plate element 75 in turn comprises a substantially horizontal plate 78 and vertical plates 18 and 8. Trough element 85 is positioned on one side of vessel 3 and as shown is formed by the wall of the vessel in conjunction with horizontal plate 21 and vertical plate 24. Horizontal plate 21 is substantially perpendicular to the wall of vessel 3 and extends inwardly of the vessel where it intersects and is sealed to the lower edge of plate 24. The peripheral edge of plate 21 is continuously sealed to plate 24 and to the wall of vessel 3 and thus provides trough member 85 with a fluid-tight construction.

Horizontal plate 78 of plate element 75 is sealed to the upper edge of plate 8 and extends horizontally to a point vertically above trough member 84 of the next contacting stage 4. The peripheral edge of horizontal plate 78 between its two edges is continuously sealed to the wall of vessel 3. The edge of plate 78 that is vertically above trough 84 is sealed to the upper edge of vertical plate 18, and the vertical edges of plates 8 and 18 in turn are sealed to the wall of vessel 3. Thus, plate element 75 essentially resembles an inverted trough whose bottom is plate 78 and whose sides are the walls of the vessel 3 and plates 8 and 18. The side walls 8 and 18 of the inverted trough or plate element 75 are necessarily unequal in height since they terminate within trough elements that are at different vertical positions within vessel 3.

Vertical plate 8 extends downwardly within trough member 85 to a point vertically spaced from the bottom of the trough but also below the upper edge of vertical plate 24. The lower edge of plate 8 may be a continuous straight line but it is preferably provided with serrations, perforations, and the like. Thus, the lower edge of plate 8 constitutes a weir and particularly a notched type of weir.

Vertical plate 18 extends downwardly within trough element 84, its lower edge being substantially a horizontal line vertically intermediate the bottom of trough 84 (plate 22) and the upper edge of plate 25. Vertical plates 18, 16 and 17 are longer than corresponding plates 7, 8 and 9 and in each instance are positioned within the trough elements laterally intermediate the wall of vessel 3 and the shorter plates 7, 8 and 9. The lower horizontal edges of plates 16, 17 and 18 may be substantially in the same horizontal plane as the lower horizontal edges of plate portions 7, 8 and 9, respectively. It is preferred, however, that the lower edges of the former plates extend somewhat farther within the trough elements than the latter plates do. The vertical edge of plate portions 16, 17, 18 and 19 extend to and are continuously sealed to the inner wall of vessel 3.

Suitable mechanical mixing devices 33, 34 and 35 are preferably provided within the conduits 36, 37 and 38 that are formed and laterally bounded by vertical plates 16, 17 and 18 and vertical plates 7, 8 and 9, respectively, and the walls of vessel 3. Conduits 36, 37 and 38 are open at each vertical end and thus provide access for the flow of liquid between the interior portions of trough members 86, 85 and 84, respectively, and settling zones 70, 71 and 72.

The mixing devices 33, 34 and 35 may be selected from the many mechanical devices that are conventionally employed for mixing liquids. It is specifically desired that the mixer be of a character to provide a high degree of mixing without any substantial pumping action. As illustrated in Figures 1 and 2, a suitable type of mixer 33 may consist of a plurality of spaced paddle blades 40 arranged in one or more rows along a rotatable shaft 39 that extends laterally throughout a mixing conduit or zone 36. The blades in each row may be staggered as shown. The shaft may be driven by a suitable power source 43 which may be positioned outside the vessel proper. Packing glands or mechanical seals 41 and 42 may be employed to seal the shaft 39 where it passes through the walls of the vessel.

Other mechanical mixers that may be used include propeller elements, turbo-mixers, etc. A particularly preferred type of mixing element is the vibrating plate type described in co-pending patent application Serial No. 75,904, filed on February 11, 1949, by Fenske et al., now U. S. Patent 2,667,407.

In addition to the mechanical mixers enumerated above, conventional packing materials may also be employed alone or in combination with mechanical mixers in the mixing zones of the present contacting stages. Any of the packing materials customarily used for liquid-liquid contacting processes may be employed. For example, Raschig rings, Berl saddles, wire mesh, and the like materials may be used.

The nature of the apparatus described above and illustrated in Figs. 1 and 2 may be better understood by considering the manner in which this apparatus is operated when employing two incompletely miscible liquids of different densities, as for example, phenol and petroleum mineral oil. The latter liquid, of course, is the lighter of these two liquids.

In accordance with the present invention, the mineral oil enters a lower portion of vessel 3 by means of valve 2 and inlet conduit 10 which are preferably positioned slightly above the bottom of the vessel.

The phenol, in turn, enters a top portion of vessel 3 via conduit 11, valve 14 and downcomer conduit 44 which is formed by the walls of vessel 3, vertical plate 16 and horizontal plate 48. Conduit 11 is preferably located near the top of vessel 3 but below the phenol-oil interface 26 that exists near the top of the vessel. In this connection, it will be noted that in the process under consideration the phenol is present within vessel 3 as a continuous phase and the oil is present as a discontinuous phase. Thus, there is a continuous phenol path from the point where the phenol enters the tower through conduit 11 and the point where the phenol leaves the bottom of the tower through conduit 13. On the other hand, the oil is present in the form of liquid layers only at points below the bottom surface of plate elements 74, 75, and 76 and immediately below the top inner surface of the contacting vessel. The oil layers 61, 62, 63 and 64 are depicted as such within Fig. 1. The liquid phase interfaces that exist between these oil layers and the continuous oil phase are identified in Figure 1 by the characters 26, 27, 28 and 29.

The position of interface 26 may be maintained within vessel 3 primarily by valve 14 which controls the amount of phenol entering the vessel in response to variations in the interface position. In other words, when phase interface 26 falls to an undesirable level within vessel 3, valve 14 opens and phenol is admitted to the vessel. Conversely when interface 26 rises to an undesirable degree, valve 14 closes and thus restricts the flow of phenol to the vessel. The positions of the phase interfaces 27, 28 and 29 are controlled and maintained in a manner which will become clearer in the following description.

As mentioned above, phenol enters vessel 3 via conduit 11 and flows downwardly through conduit 44 to a point within trough 86. Here it is contacted with oil which enters trough 86 via conduit 50 from the oil layer 62 which exists beneath plate element 76. The combined streams of phenol and oil that enter trough 86 flow upwardly through conduit 36 whence they are discharged into settling zone 70. Conduit 36 may also be considered to be a mixing zone since the oil and phenol are intimately contacted and mixed at this point. The degree of mixing within conduit 36 is preferably controlled by means of a mechanical mixer 33.

Mixer 33 may be driven at a speed best adapted to provide the degree of mixing required for any particular combination of two or more liquids. In this connection it may be desirable to use variable speed drives as the driving means. It will also be appreciated that a wide variety of mixer designs may be employed other than the paddle-like element shown in the figures. For example, endless screw elements, forked members, propeller elements, and so forth may also be used. As described earlier, a particularly attractive mixing device for use in the present invention consists of a vibrating plate type of mixer described in the aforementioned patent application of Fenske et al., now U. S. Patent 2,667,407. As described therein this device depends for its mixing ability upon vibrating a plurality of perforated plates in a plane that is perpendicular to the direction of flow of the liquid being mixed.

The mixture of oil and water as it issues from conduit 36 separates into distinct oil and phenol layers as it flows laterally within settling zone 70. The separated oil rises until it passes through interface 26 and enters oil layer 61. Oil is then withdrawn from vessel 3 via valve 15 and conduit 12. Valve 15 may be operated automatically by a pressure responsive element which may be positioned in the light phase withdrawal line or in the top of the extraction vessel. By this means, sufficient quantities of oil (the light discontinuous phase liquid) are released to line 12 to maintain the pressure within the vessel at a desired value.

The phenol which is separated within settling zone 70 flows laterally across the top surface of plate element 76 until it reaches the top of conduit 45. At this point it leaves stage 6 and flows substantially vertically downward through conduit 45 to a point within trough 85. Here it is contacted with oil which has entered trough 85 via conduit 51 from the oil layer 63 which is maintained below the surface of plate element 75. Just as in the mixing zone of stage 6, the oil and phenol within trough 85 are mixed in vertical conduit or mixing zone 37 and thence discharged into settling zone 71. Here the mixture of phenol and oil again separates as it flows laterally within vessel 3 to form discrete particles of phenol and oil. The oil rises until it passes through interface 27 and enters oil layer 62. The phenol on the other hand continues flowing across plate element 75 until it reaches conduit 46 whence it flows downwardly into trough 84 where it again meets oil which has entered this trough from oil layer 64 which in turn has been trapped under tray element 74. Once again the phenol and oil are mixed in conduit 38 and are discharged into settling zone 72. The mixture in zone 72 is again separated, with the oil entering oil layer 63 and the phenol flowing laterally across plate element 74 to downcomer conduit 47. The phenol leaves conduit 47 and enters the bottom portion of vessel 3 whence it flows out through conduit 13 and valve 1.

As described earlier, it is a feature of the present invention to provide a means for continuously maintaining a layer of discontinuous phase liquid within each contacting stage regardless of the liquid flow rates, pressures and the like that exist within the overall contacting vessel. This liquid layer serves two purposes: (1) it facilitates complete settling of the heavy phase from the light phase before it enters the next higher mixing zone, and (2) it provides a liquid seal to prevent the heavy, continuous phase bypassing from the exit end of one stage to the exit end of the second lower stage. The manner in which this objective is realized may be best illustrated by referring to Figure 1. Considering for the moment the oil layer 62 which exists under plate element 76, it will be observed that this layer is trapped between the walls of the vessel and plates 7, 79 and 17. It will further be observed that a difference in levels exists between the body of oil in conduit 50 and the main body of oil 62. This difference in levels is, of course, made possible by the plate 23 of trough element 86 which projects upwardly into oil layer 62. Plate 23 also provides a liquid seal between stages 5 and 6 in that it prevents bypassing of phenol between the stages at this point. In other words, phenol from stage 6 must flow through conduit 45 and up through conduit 37 in order to reach stage 5.

The difference in the oil levels is a characteristic of the hydraulic balance which exists between the liquid in stage 5 and the liquid in stage 6. Thus, dispersed oil-in-phenol phases in conduits 36 and 37 are balanced against a column of substantially pure phenol in laterally corresponding parts of conduit 45 by an elevation of the phase interface 27 above the head of oil passing under weir 7. Interface 27 is, in turn, lowered by any friction head which is required to maintain flow of the oil and phenol through the various conduits. The actual friction head may be estimated by conventional calculated methods.

Oil in flowing from conduit 50 into conduit 36 passes under a weir which is provided at the lower edge of plate 7. It will be appreciated that this weir must be sufficiently lower than the upper edge of plate 23 in order to continuously maintain a liquid seal between stages 5 and 6 regardless of the phenol and oil flow rates that may be employed. It will further be appreciated that this weir must be spaced from the bottom of trough 86 a distance sufficient to permit the free flow of oil from conduit 50 to conduit 36. In other words, the portion of the lower edge of plate 7 within trough element 86 must always be such that it may act as a weir for the oil stream. The optimum position of such a weir within trough element 86 is, of course, a matter of design which may vary somewhat from case to case. The head required to maintain flow over a weir varies as approximately the ⅔ power of the flow rate rather than approximately the 2 power as for flow through a perforated plate. Further, the absolute value of weir head can be kept small by providing adequate weir length. Thus, although the phase interface ahead of plate 23 varies with the weir head under plate 7, the magnitude can be kept low by proper design.

In considering the dimensions of contacting vessel 3, it will be appreciated that its effective diameter is a matter of some importance since sufficient settling time must be provided within each of the contacting stages to permit the separation of the oil and phenol mixtures that exist in each of the settling zones. In so far as the heights of the settling zones or stages are concerned, it is considered that heights up to about 2 to 3 feet or more may be used. These factors, of course, are matters of design which may be determined for any given operating case by one skilled in the art who has cognizance of the principles presented herein.

Figure 3:
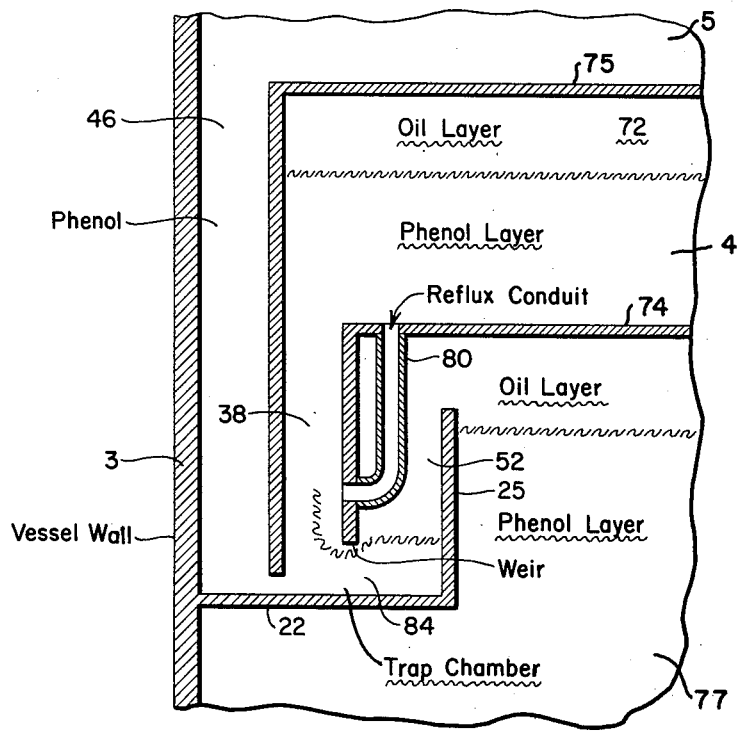
Figure 3 is a fragmentary, cross-section, detailed view of a mixing zone in a contacting stage corresponding to stage 4 of Figure 1, this view depicting conduit means suitable for recycling a portion of the continuous phase liquid from the settling zone of one stage back to the entrance of the mixing zone of that same stage.

It will be understood that the foregoing description has been concerned with merely one embodiment of the present invention. An even more detailed embodiment is illustrated in Figure 3 where it is shown how a portion of the continuous phase liquid that has settled out in the settling zone of a stage may be returned or recycled to the mixing zone of the stage. The particular stage depicted is stage 4 of Figure 1 which is made up of trap chamber 84, mixing zone 38 and settling zone 72. The liquids considered to be present are again phenol and oil.

As pointed out earlier, oil from conduit 52 and phenol from conduit 46 are united and mixed in mixing zone 38. The resulting mixture discharges into settling zone 72 where it separates into distinct oil and phenol layers. The liquids in these layers for the most part move transversely across zone 72. But a portion of the phenol may be returned to mixing zone 38 by means of conduit 80 which interconnects the bottom portion of settling zone 72 with the interior of the mixing zone. Stated in more general terms, conduit 80 connects an intermediate portion of the conduit or mixing zone 38 with that side of the horizontal plate member 74 that faces away from its corresponding trough 84. The size of the reflux conduit and the volume of reflux may be controlled as desired.

Figure 4:
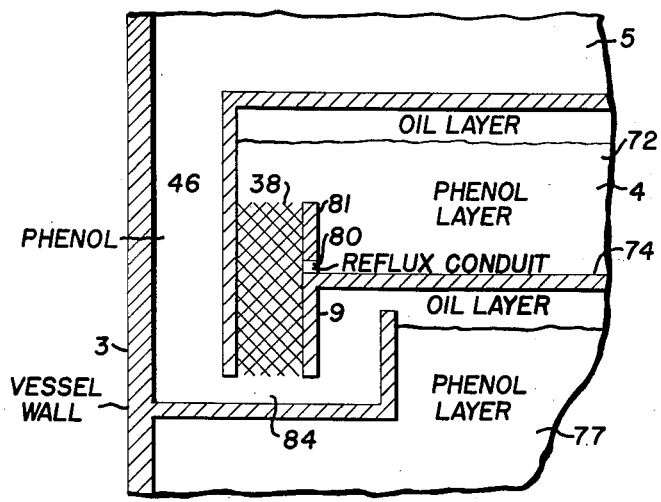
Figure 4 is a fragmentary, cross-section view of a mixing zone corresponding to that of stage 4 in Figure 1, in which the mixing zone is provided with a bed of packing material. The mixing zone in this instance extends vertically into the settling zone and may be provided with a reflux conduit of the type illustrated.

Figure 4 illustrates still another embodiment of the present invention wherein the mixing zone 38 of stage 4 in the apparatus of Figure 1 is provided with mixing means in the form of a bed of wire mesh. Mixing zone 38 is further characterized by being extended within settling zone 72 by means of plate element 81 which preferably extends vertically from plate element 74 to a point vertically intermediate plate element 74 and the phase interface that exists in the settling zone. Thus, mixing zone 38 is still laterally confined from its settling zone 72, but is at least partially on the same horizontal level as the settling zone.

Plate element 81 may be provided with one or more reflux conduits 80 which are adapted to return a portion of the continuous phase liquid from settling zone 72 back to the mixing zone 38. This provision increases the contacting efficiency of the overall stage, although it may in some instances interfere slightly with the separating efficiency of the settling zone.

As explained earlier, the packing material in mixing zone 38 is preferably a wire mesh type of packing. Other suitable packing materials include Berl saddles, Raschig rings, solid particles, etc.

In any case the packing in zone 38 may extend partially or completely throughout the entire length of the zone.

In multi-stage tower, it may be desirable to have some mixing zones that contain packing and some that do not. Similarly, in the case where mechanical mixing means are employed, it may be desirable to have some of the mixing zones provided with such devices and some not. In general, however, it is preferred to provide each of the mixing zones in a tower with mechanical mixers that can be varied as to their mixing intensities.

In a broad sense then the present invention relates to a process and apparatus for contacting incompletely miscible liquids of different densities in which the liquids are intimately mixed stagewise in a substantially vertically disposed mixing zone and then separated as they flow substantially horizontally in a suitable settling zone. The flow of the two liquid streams between stages is countercurrent although the flow through each of the mixing and settling zones is actually substantially concurrent. The present invention is further characterized by the provision of positive liquid seals between each pair of contacting stages, thus preventing bypassing of the liquids between the stages regardless of the operating conditions employed. The sealing means is additionally characterized by the fact that it continuously maintains a layer of the non-continuous phase liquid within each contacting stage and that the interface location beneath the non-continuous phase liquid layer is substantially insensitive to the non-continuous phase flow rate.

The type of weir that is employed to regulate the flow of discontinuous phase liquid from one stage to the next stage may vary in design without departing from the scope of the present invention. For example, conventional weirs such as rectangular weirs, triangular weirs, sharp-edged weirs, broad crested weirs and the like may be used. Similarly, the weirs may be notched in a variety of patterns. The notches may be circular, semi-circular, triangular, trapezoidal and so forth in shape.

It will also be realized that a variety of plate element and trap element designs other than those illustrated in Figure 1 may be employed. For example, the sharp corners such as are formed by plates 17 and 79 and plates 7 and 79 of plate element 76 and by plates 23 and 20 of trap element 86 may be bevelled or curved so as to provide a variety of liquid flow patterns. In addition, the downcomer conduits between the stages, the trap chambers, the mixing zones and the settling zones may vary considerably in their physical construction and size without departing from the spirit of the present invention.

While the present description has been applied to a case where the continuous phase liquid is heavier than the discontinuous phase liquid, it will be appreciated that the apparatus and process may also be adapted to processing situations in which the continuous phase liquid is the lighter of the two liquids. In this instance, contacting tower 3 may merely be inverted so that the continuous phase liquid in entering the tower through conduit 11 will flow upwardly through conduit 44 and so on through the tower until it reaches the continuous phase liquid outlet 13. It will be noted that the inlet and outlet connections for the two liquids remain the same when the continuous phase liquid becomes the lighter of the two liquids being handled. It will be further noted that the interface between the two liquids which exists near the top of the contacting vessel 3 in the apparatus of Fig. 1 will remain adjacent the withdrawal conduit that is employed for the withdrawal of the discontinuous phase liquid from the vessel.

The present invention may be applied to a variety of processing problems other than the one described earlier herein. For example, it may be applied to a number of petroleum refining operations such as solvent extraction, solvent dewaxing, deasphalting, caustic treating, water washing, acid treating and the like. It may be further modified by the incorporation of pumps, valves, heating elements, controllers, piping and other conventional forms of equipment that are commonly employed with liquid-liquid contacting apparatus by those skilled in the art. Furthermore, emulsifying agents, surface active agents, anti-solvents and the like may be added to the liquids being processed whenever such expedients are desired.

What is claimed is:

1. A process for countercurrently contacting two incompletely miscible liquids having different specific gravities wherein one of the liquids is present in a continuous phase and the other liquid as a discontinuous phase which comprises maintaining a plurality of vertically superposed contacting stages, introducing the continuous phase liquid in the stage at a first end of the plurality of stages and withdrawing the liquid from the stage at the opposite end of the plurality of stages, introducing the discontinuous phase liquid within said stage at said opposite end and withdrawing this liquid from the stage at said first end, introducing the heavier liquid within the uppermost stage, mixing the two liquids in a laterally confined, vertical, concurrent flow path in each contacting stage, the direction of flow in each mixing zone being vertically toward the stage where the continuous phase liquid enters the plurality of stages, passing the mixture from the mixing zone in each stage laterally through a settling zone and separating the mixture into two separate phase layers, withdrawing the continuous phase liquid from its respective phase layer in the settling zone of each stage and passing it in a confined flow path to the mixing zone of the next stage, withdrawing the discontinuous phase liquid from its respective phase layer in the settling zone of each contacting stage and passing it through a liquid sealing zone into the mixing zone of the next stage, distributing the discontinuous phase liquid across the entrance to each mixing zone in the form of a weir sheet.

2. A process as defined in claim 1 in which the continuous phase liquid is heavier than the discontinuous phase liquid and the direction of liquid flow in the mixing zone of each stage is vertically upward.

3. A process as defined in claim 1 in which the continuous phase liquid is lighter than the discontinuous phase liquid and the direction of liquid flow in the mixing zone of each stage is vertically downward.

4. A process as defined in claim 1 in which the liquid streams in the mixing zone of each stage are mechanically mixed.

5. A process as defined in claim 1 in which a portion of the settled continuous phase liquid in the settling zone of a stage is recycled to the mixing zone of the stage.

6. An apparatus for countercurrently contacting two incompletely miscible liquids having different densities which comprises a vessel adapted to contain liquids, a plurality of superposed contacting stages within said vessel, each stage comprising a trough member and a tray member, each said trough member being positioned on one side of said vessel and adjacent the wall of the vessel, successive trough members being on opposite sides of said vessel from each other, each said tray member comprising a horizontal plate portion vertically displaced from the open portion of its respective trough member, one edge of each said horizontal plate terminating in vertical alignment with the interior portion of its respective trough member, a second edge of said horizontal plate portion terminating in vertical alignment with the interior portions of the trough members positioned on the opposite side of said vessel, the portion of each said horizontal plate portion between said first edge and said second edge extending and being sealed to the interior wall of said vessel, a first vertical plate portion of each said tray member being sealed to said first edge of its respective horizontal plate portion and extending vertically through the open portion of its respective trough member and terminating therein in the form of a weir, a second vertical plate portion of each said tray member sealed to said second edge of its respective horizontal plate portion and extending vertically through the open portion of the trough member of an adjacent stage and terminating therein, said second vertical plate portion being positioned intermediate the wall of the vessel and the first vertical plate member of said adjacent stage, said second vertical plate portion forming a first conduit with the wall of the vessel and providing liquid access from its respective stage to the trough member of said adjacent stage, said second vertical plate portion forming a second conduit with the first vertical plate portion of the tray member of the adjacent stage and providing liquid access from within said adjacent trough member to said adjacent stage, conduit means at each vertical end of the vessel for introducing the two liquids within the vessel and for withdrawing the contacted liquids from the vessel in a countercurrent relationship, the conduit means for introducing the heavier liquid being disposed at the upper end of the vessel, the open portion of each trough member being disposed toward that end of the vessel where the continuous phase liquid enters the vessel.

7. Apparatus as defined by claim 6 including mechanical mixing means positioned in said second conduit.

8. Apparatus as defined by claim 6 in which said second conduit contains a packing material adapted for liquid-liquid contacting.

9. Apparatus as defined by claim 6 including an additional conduit means extending from within said second conduit intermediate the ends thereof to that side of said horizontal plate member that faces away from its respective trough member, whereby to provide a recycle path, into said second conduit, for continuous phase liquid that collects adjacent said last named side of said horizontal plate member.

References Cited in the file of this patent

UNITED STATES PATENTS

| | | |
|---|---|---|
| 2,667,407 | Fenske et al. | Jan. 26, 1954 |
| 2,151,592 | Ferris | Mar. 21, 1939 |
| 2,290,209 | Rosenthal | July 21, 1942 |